Jan. 7, 1947.   E. R. WEAVER   2,413,737
ADHESIVE TENSION PATCH
Filed Oct. 17, 1945
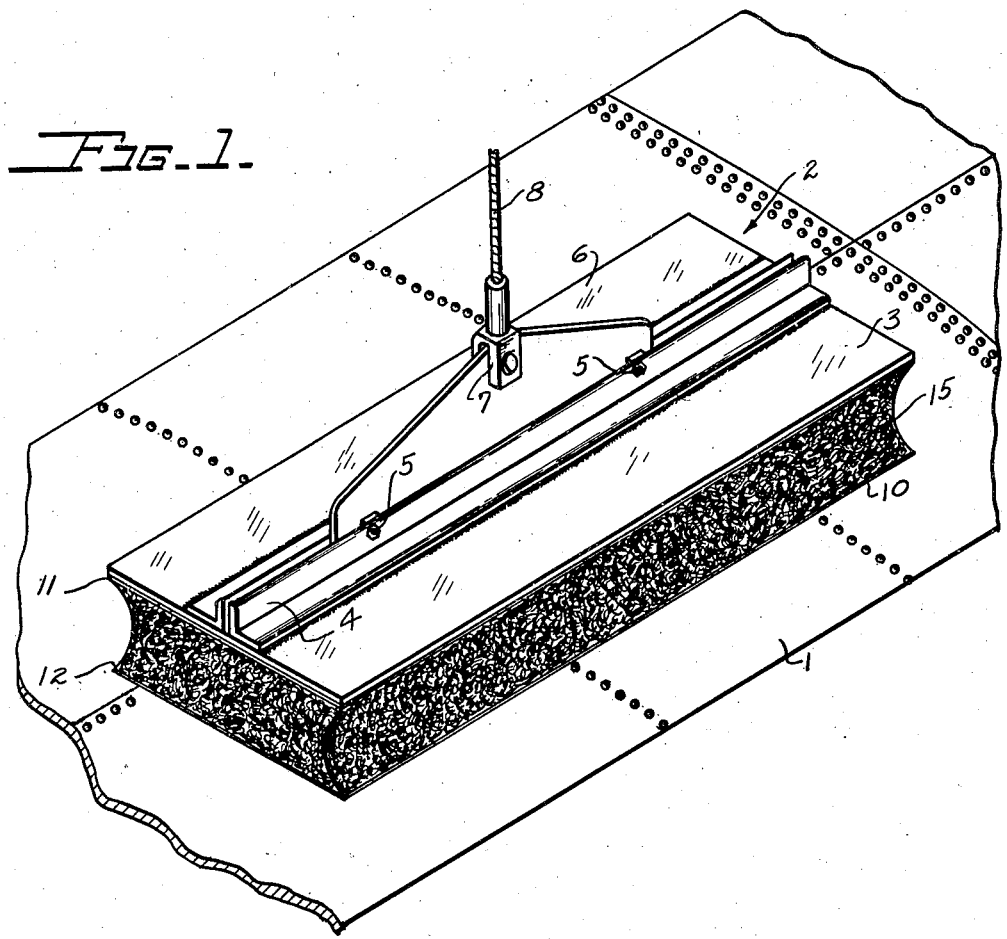
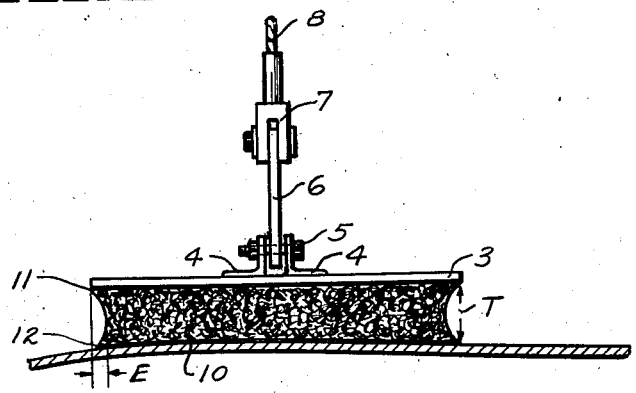
INVENTOR
EDGAR R. WEAVER
BY Chase Toomey AND
Ransley O. Wyatt
ATTORNEYS Patented Jan. 7, 1947

2,413,737

UNITED STATES PATENT OFFICE 2,413,737

ADHESIVE TENSION PATCH

Edgar R. Weaver, Dayton, Ohio

Application October 17, 1945, Serial No. 622,912

3 Claims. (Cl. 73—88)

(Granted under the act of March 3, 1883, as amended April 30, 1928; 370 O. G. 757)

The invention described herein may be manufactured and used by or for the Government for governmental purposes without payment to me of any royalty thereon.

This invention relates to improvements in adhesive tension patches for use in the static testing of aircraft such as disclosed in U. S. Patent No. 2,383,491, granted August 28, 1945, to Paul H. Kemmer and myself. Lifting patches as disclosed in the aforementioned patent comprises a rigid metal backing plate having means thereon for attaching a load applying means such as a cable and the like and a thick pad of resilient material in the form of sponge natural or synthetic rubber is adhesively bonded to the backing plate and to the skin of the aircraft to be tested to apply a distributed load to the same. The prior art patch constructions have proven very satisfactory except some difficulty has been encountered in obtaining a firm bond between the edges of the patches and the aircraft skin due to the fact that in applying pressure to the patches during setting of the cement the sponge rubber sides of the patch bulge outward making it difficult to press the edges of the patch into firm contact with the aircraft skin. It has further been found when applying heavy loads to the patches that there is a high stress concentration at the edges of the rubber pad which causes a tearing or separation of the pad from the aircraft skin and the backing plate at unit stresses less than the maximum stress that the cemented joint would otherwise be capable of developing.

In accordance with the present invention, the above noted difficulties are obviated by inwardly curving the side walls of the rubber patch so that a tool or the finger may be used in pressing down the edges of the rubber pad when cementing the same to the backing plate and to the aircraft skin. The feature also serves to relieve the concentration of stress at the edges of the cemented areas and permits the patches to carry higher loads without liability of failure than the prior constructions.

It is therefore an object of the invention to provide a lifting patch in which the edges of the rubber pad can be brought into firm contact with the backing plate and aircraft skin during cementing and which will avoid stress concentration at the edges of the sponge rubber pad during application of load to the patch to thereby obviate tearing at the cemented joints.

Other objects and features of the invention will appear by reference to the detailed description hereinafter given and to the appended drawing in which:

Fig. 1 is an isometric view illustrating a patch constructed in accordance with the invention and;

Fig. 2 is an end view of the assembly of Fig. 1.

Referring now to the drawing, the reference numeral 1 generally indicates a portion of the skin of an aircraft structure to which test loads are to be applied by a lifting patch assembly generally indicated by the reference numeral 2. The patch assembly 2 comprises a rigid rectangular backing plate 3 made of metal having angle members 4 secured thereto as by welding. Bolts 5 passing through the spaced backs of the angles serve to connect the backing plate to a lifting plate 6, the latter being capable of a limited angular movement and in turn pivotally connected to the clevis 7 secured to the lifting cable 8.

A rectangular pad 10 of natural or synthetic sponge rubber has its upper and lower faces 11 and 12 respectively cemented throughout with commercially available rubber cement to the under surface of the backing plate 3 and to the aircraft skin. The pad 10 is generally made at least from one half inch to one and one half inches in thickness and varying types of sponge are employed depending on the maximum load to be carried.

The pad 10 has its side walls 15 grooved or curved inwardly so that they merge into the faces 11 and 12 with a feather edge and the maximum depth of the side wall grooves indicated as E (Fig. 2) varies with the type of sponge being preferably not less than $\frac{1}{16}$ the pad thickness T for the most dense sponge suitable for the purpose to $\frac{1}{4}$ T for the softest sponge. The feather edges permit the finger or a tool to be used in pressing down the edges of the pad when cementing the same to the backing plate 3 and the aircraft skin 1.

When load is applied to the improved patch construction the grooves in the side walls of the rubber pad 10 allow the overhanging edge portions to deflect more readily than the central portion of the pad and consequently stress concentration at the edges of the cemented joints is avoided and the patch assembly can be used to apply a greater load than heretofore without danger of tearing of the sponge rubber pad.

Having described my invention what I declare to be new and wish to secure by Letters Patent is:

1. In an adhesive tension patch construction for static testing of aircraft of the character comprising a rigid backing plate having load applying means secured thereto and a body of resilient material having side walls and opposed end faces, one face being adhered throughout to said backing plate and the opposed end face being adapted to be adhered throughout to the structure of the aircraft; the improvement in which the side walls of said resilient body are curved inwardly from the boundary edges of said opposed end faces.

2. In an adhesive tension patch construction for static testing of aircraft of the character comprising a rigid backing plate having load applying means secured thereto and a body of sponge rubber having side walls and opposed end faces, one face being adhered throughout to said backing plate and the opposed end face being adapted to be adhered throughout to the structure of the aircraft; the improvement in which the side walls of said sponge rubber body are curved inwardly from the boundary edges of said opposed end faces.

3. In an adhesive tension patch construction for static testing of aircraft of the character comprising a rigid backing plate having load applying means secured thereto and a body of resilient material having side walls and opposed end faces, one face being adhered throughout to said backing plate and the opposed end face being adapted to be adhered throughout to the structure of the aircraft; the improvement in which the side walls of said resilient body are formed with a groove extending inwardly from the boundary edges of said opposed end faces and the cross sectional area of said resilient body at a median plane between said opposed end faces being substantially less than the area of the respective end faces, whereby the stresses on said resilient body under applied load are less at the boundary edges of said opposed end faces than the stress on the cross section of said body at the median plane between said opposed end faces.

EDGAR R. WEAVER.